April 25, 1939.  J. C. WILLIAMS  2,155,628
BEARING SEAL
Filed Nov. 10, 1937
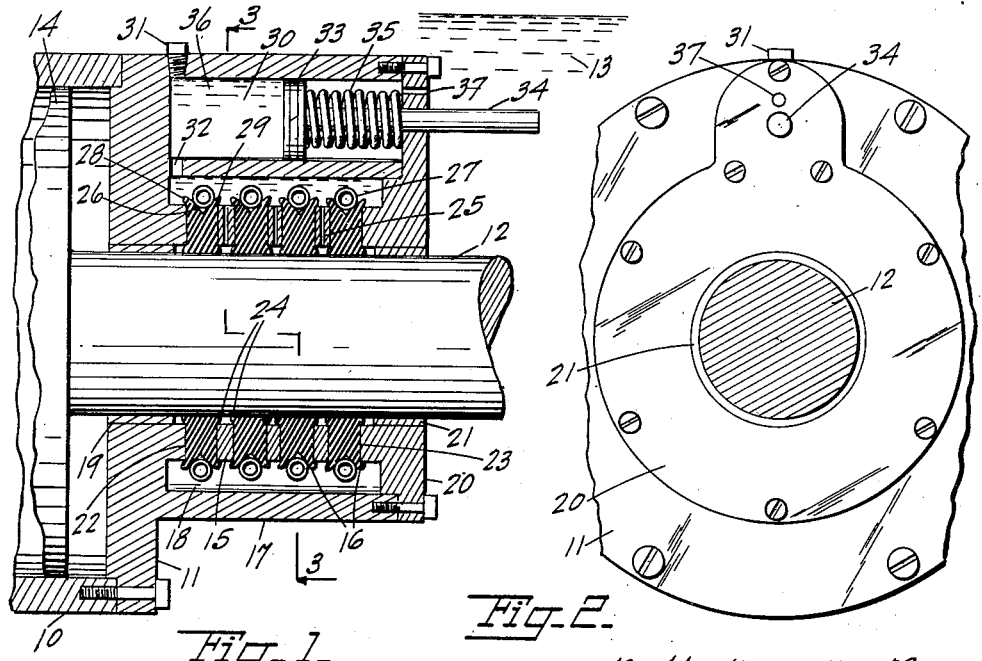
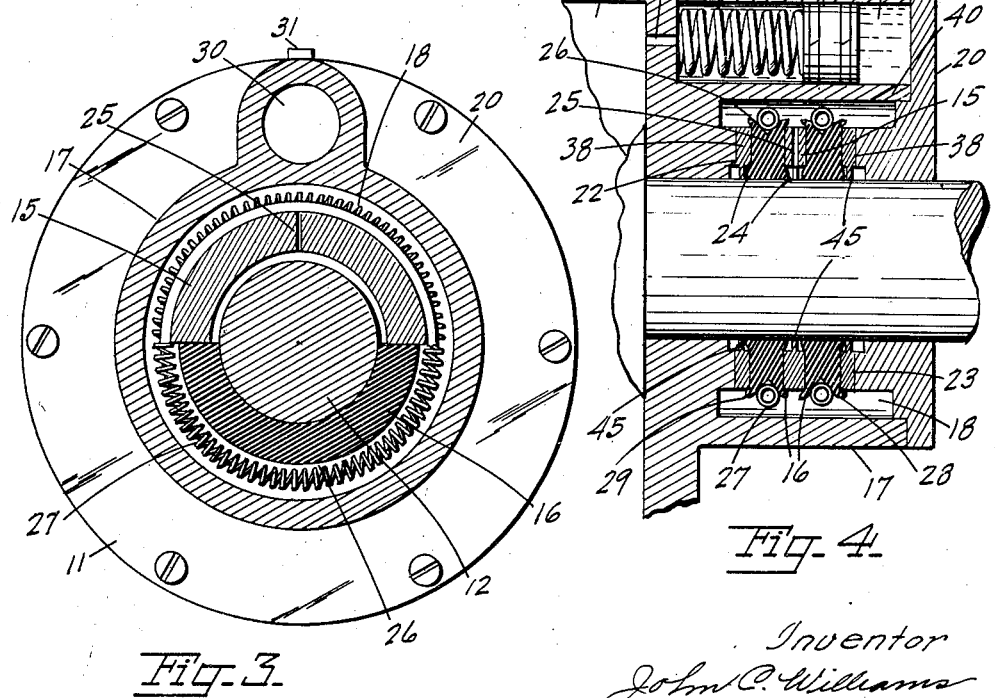
Inventor
John C. Williams
By Philip A. Friedell
Attorney Patented Apr. 25, 1939

2,155,628

UNITED STATES PATENT OFFICE 2,155,628

BEARING SEAL

John C. Williams, Oakland, Calif.

Application November 10, 1937, Serial No. 173,837

6 Claims. (Cl. 286—27)

This invention, a bearing seal, is designed for the purpose of sealing the clearance space between shafts and piston rods and their bearings, as also for other types of devices in which one member is either reciprocal or rotatable in another, against escape of fluids along the bearing or member, and is adaptable for use in connection with submersible devices, pumps, compressors, and other devices having either rotating or reciprocating members, and which devices are subjected to fluid pressures either above or below atmospheric, either internally or externally. Copending application, Serial Number 173,839, filed November 10, 1937, for Periscope, covers a seal which is particularly adapted for sealing non-circular elements.

The objects and advantages of the invention are as follows;

First; to provide sealing means which will effectively prevent escape of fluid between a bearing and a member rotatable or reciprocal therein.

Second; to provide a seal as outlined with means which will automatically compensate for variations in pressure of the fluid seeking escape.

Third; to provide means in association with a seal as outlined which will maintain a sealing pressure of the seal at all times at a value greater than the pressure of the fluid sealed against.

Fourth; to provide sealing means of the type outlined which will maintain its sealing efficiency irrespective of predetermined angular, flexing, or eccentric movements of the members sealed.

Other objects and advantages of the invention will become apparent as the following description is read on the drawing forming a part of this specification, and in which similar reference characters are used to designate similar parts throughout the several views, of which;

Fig. 1 is a longitudinal sectional elevation through the seal as adapted for piston rods and similar elements operating in a fluid of submergence.

Fig. 2 is an end elevation of Fig. 1.

Fig. 3 is a section taken on line 3—3 of Fig. 1.

Fig. 4 is a longitudinal sectional elevation through the seal as adapted to devices subjected to internal fluid pressures, such as pumps and compressors.

The invention consists of a series of alternate rigid and resilient rings filling a space between opposed thrust faces under predetermined compression, with the resilient rings circumferentially compressed to hug the reciprocating or sliding element of the device, such as a piston rod or a shaft, and with the rigid rings clearing the rod or shaft sufficiently to permit the resilient rings to bulge or mushroom about the internal corners of the rigid ring, and with the entire assembly of rings subjected externally to the pressure of a lubricant, such as grease or other fluid or semi-fluid medium, and the specific arrangement of rings varies terminally according to the operating conditions of the member sealed thereby.

In Fig. 1 is shown a sealing arrangement which is particularly adapted to piston rods, pistons, periscopes, and other sliding or reciprocating members, and in which a housing or cylinder 10 having a head 11, and a piston rod 12, is subjected externally to fluid pressure, such as the pressure of a fluid of submergence 13, while the piston 14 and the interior of the housing or cylinder is subjected to a different pressure, and the seal as shown is adapted particularly to prevent ingress of fluid of submergence along the piston rod into the cylinder.

In this case, the series of alternate resilient and rigid rings consist of one or more rigid rings 15 and two or more resilient rings 16, the number of resilient rings numbering one in excess of the number of rigid rings, the terminal rings being of the resilient type.

The seal unit consists of a seal housing 17 which is integral with, or secured to, the cylinder head 11, and which housing is provided with an annular chamber 18 and suitable bearings 19.

This seal housing is closed at its outer end by means of a cover or head 20 having a suitable bearing 21 for the piston rod 12.

The cylinder head end of the chamber is provided with an annular thrust face 22, and the cover 20 is provided with an annular seal thrust face 23, forming thus opposed thrust faces.

Two or more resilient rings 16, formed of rubber or other resilient material or rubber substitute of a non-porous nature, internally fit the piston rod 12 snugly, and the terminal resilient rings respectively resiliently cooperate with the opposed thrust faces 22 and 23, and rigid rings 15, formed of some rigid material, such as metal, moldable plastics, hard rubber, or carbon, are interposed between the resilient rings and have each a bore clearing the shaft sufficiently to permit bulging of the resilient ring about the inner peripheral corners of the rigid rings and thrust faces as indicated at 24, and the rigid rings are each provided with bleeder passages 25 for feeding lubricant under pressure to the shaft and to the mushroomed portions of the resilient rings.

The entire assembly of rings is normally slightly compressed between the thrust faces 22, 23.

The resilient rings are slightly larger in diameter than the rigid rings, and are each provided with an annular V-groove 26 in which an encompassing tension element, such as a spiral spring 27 under tension is seated, these springs functioning to cause the resilient rings to more tightly hug the shaft and mushroom the outer peripheral edges 28 and 29 about the outer corners of the rigid rings. These rings obviously act to expand the rings transversely to increase the compression on the thrust faces and to contract the rings radially toward the axis. The parts so far described provide a complete and efficient seal for normal or comparatively low pressures.

For submersible use or under conditions of high external pressures, means is provided for increasing the hugging action of the resilient rings on the shaft and the mushrooming effect about the corners of the rigid rings, and for supplying lubricant such as grease under high pressure to the interior chambers formed between the shaft and the rigid rings, and this means increases the pressure in proportion to the increase in external pressure or pressure of submergence, and consists of a cylinder 30 formed in the seal housing and provided with a filler plug 31 and a passage 32 communicating with the interior of the seal chamber 18, the head 20 functioning as a head for this cylinder.

A piston 33 provided with a piston rod 34 functioning as a guide and gauge, is slidable in the cylinder 30 and urged under an initial predetermined pressure by means of a compression spring 35 to force lubricant 36 into the chamber 18, and suitable passages 37 admit fluid of submergence 13 to the piston to increase the pressure on the lubricant to maintain a value at all times in excess of the pressure of the fluid of submergence.

Thus, if the initial pressure of the rings 16 on the shaft 12 under the urgence of springs 27 and 35 is 15 pounds per square inch, then, if the device is lowered to a depth where the pressure of the water is 500 pounds per square inch externally, the pressure between the shaft and resilient rings will be the sum of the two, or 515 pounds per square inch.

In Fig. 4 is shown a seal which is particularly adapted against escape of internal pressures, such as reciprocating or rotary engines, compressors, or pumps, similar elements being used throughout except that the arrangement is reversed.

In this adaptation, a rigid ring 38 cooperates with each thrust face 22, 23, and these rings are similar to the rings 15 except that the bleeder passages 25 are omitted, the resilient rings are identical to the previous description, and all intermediate rigid rings are identical to the previously described rings 15, having the bleeder passages 25, and the number of rigid rings is one in excess of the number of resilient rings.

Also, the action of the pressure booster is reversed, the cover 20 forms the bottom of the cylinder 39 and the communicating passage 40 communicates between the bottom of the cylinder and the chamber 18, the piston 41 is urged toward the bottom of the cylinder under the influence of spring 42 and also by the pressure interiorly of the cylinder 43 through the passage 44. Thus the pressure of the resilient rings on the shaft 12 is always in excess of the instant pressure in the cylinder 43.

The rigid rings 15 and 38 may be provided with concentric spacing means, such as integral pins or collar 45 having a bore closely fitting the shaft, but being very narrow to permit flexure of the shaft therein.

The arrangement of rings shown in Fig. 1 is the most efficient for comparatively low rotary speeds and for reciprocating movements, while for high rotary speeds, that shown in Fig. 4 is most practical. As will be noted, the seal is very flexible and retains its sealing efficiency regardless of non-excessive angular, flexing, or eccentric motion of the shaft.

It will be understood that variations in construction and arrangement of parts, which variations are consistent with the appended claims, may be resorted to without detracting from the spirit or scope of the invention, or sacrificing any of the advantages thereof.

I claim:

1. Sealing means for relatively movable members comprising a chamber surrounding one member and having opposed thrust faces, and a series of alternate rigid and resilient rings compressibly cooperating between said thrust faces with the resilient rings hugging said one member; means circumferentially associated with and compressibly urging said resilient rings to increase the hugging action on said one member; said rigid rings freely clearing said one member and said resilient rings mushrooming about the internal peripheral corners of said rigid rings.

2. Sealing means for a shaft comprising a housing having an internal chamber provided with a thrust face at each end, a series of alternate rigid and resilient rings filling the space between said thrust faces and under slight compression therebetween, means circumferentially compressing said resilient rings to cause the rings to hug the shaft, said rigid rings clearing said shaft to permit mushrooming of the resilient rings about the inner peripheral corners of said rigid rings, the intermediate rigid rings of said series having radial passages to admit lubricant to said shaft.

3. In combination with a housing or cylinder subjected to different fluid pressures internally and externally, and a movable member or shaft projecting through a passage or bearing in one wall of said housing or cylinder, means for sealing said passage or bearing against passage of fluid under pressure along said member or shaft comprising a seal housing integral with said housing or cylinder and having an internal chamber concentric to said member or shaft and provided with opposed annular thrust seal faces, a series of alternate rigid and resilient rings filling the space between said thrust seal faces under predetermined compression, said resilient rings hugging said member or shaft through their inherent resiliency, said rigid rings having an internal diameter clearing said member or shaft to permit mushrooming of the inner peripheral corners of said resilient rings about the inner peripheral corners of said rigid rings, and the exterior diameter of said rigid rings being less than the exterior diameter of said resilient rings to permit bulging of the outer portion of said resilient rings about the outer peripheral corners of said rigid rings.

4. A structure as claimed in claim 3 in which each of said rigid rings is provided with internal concentric spacing means of a width less than the thickness of the ring and having a running fit on the member or shaft.

5. A structure as claimed in claim 3, said series of rings comprising resilient terminal rings and intermediate rigid and resilient rings, and radial lubricant passages formed through all of the intermediate rings of rigid type, and a supply of lubricant filling said chamber, a cylinder having one end in communication with a fluid under pressure and the other end in communication with said chamber, a piston in said cylinder, a spring urging said piston toward said other end to maintain said lubricant under predetermined pressure, said fluid under pressure acting on said piston to increase and maintain the pressure of the lubricant at a value equal to the pressure of the fluid plus said predetermined pressure to increase the hugging action of the resilient rings on the member or shaft and the mushrooming of the resilient rings within the rigid rings and to increase the thrust of the terminal rings of the series on the thrust seal faces in the chamber.

6. A bearing seal comprising a housing having an internal annular chamber, a shaft axially projecting through said chamber, said chamber having end walls and an annular thrust face formed on each end wall, a series of alternate rigid and resilient rings comprising resilient terminal rings and intermediate rigid and resilient rings filling the space between said thrust faces, said resilient rings having an internal diameter tightly fitting the shaft, and a V-groove formed circumferentially externally, an encompassing spiral spring operating in said groove to bulge the side walls of the groove outwardly and increase the compression of the ring on the shaft, said rigid rings having a nominal internal diameter greater than the diameter of the shaft to permit the inner portions of the resilient rings to bulge about the inner peripheral corners of the rigid rings, and an outside diameter less than the outside diameter of the resilient rings to permit the springs to bulge the outer portions of the resilient rings about the outer peripheral corners of the rigid rings, and concentric spacing members formed internally of said rigid rings and intermediate the length thereof, to maintain the rigid rings concentric to the shaft.

JOHN C. WILLIAMS.